Sept. 17, 1935.    G. W. PIERCE    2,014,413
MAGNETOSTRICTIVE RECEIVER
Filed May 11, 1935
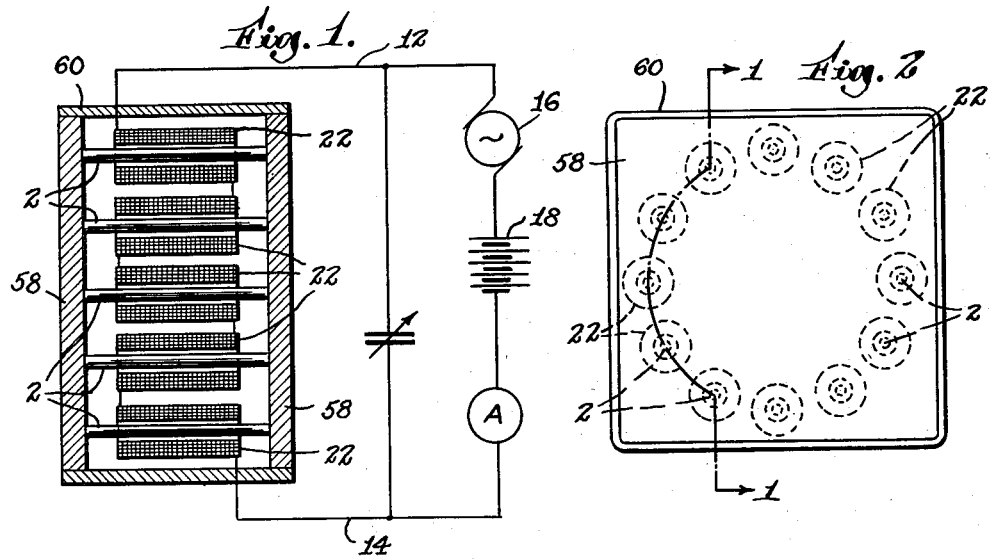
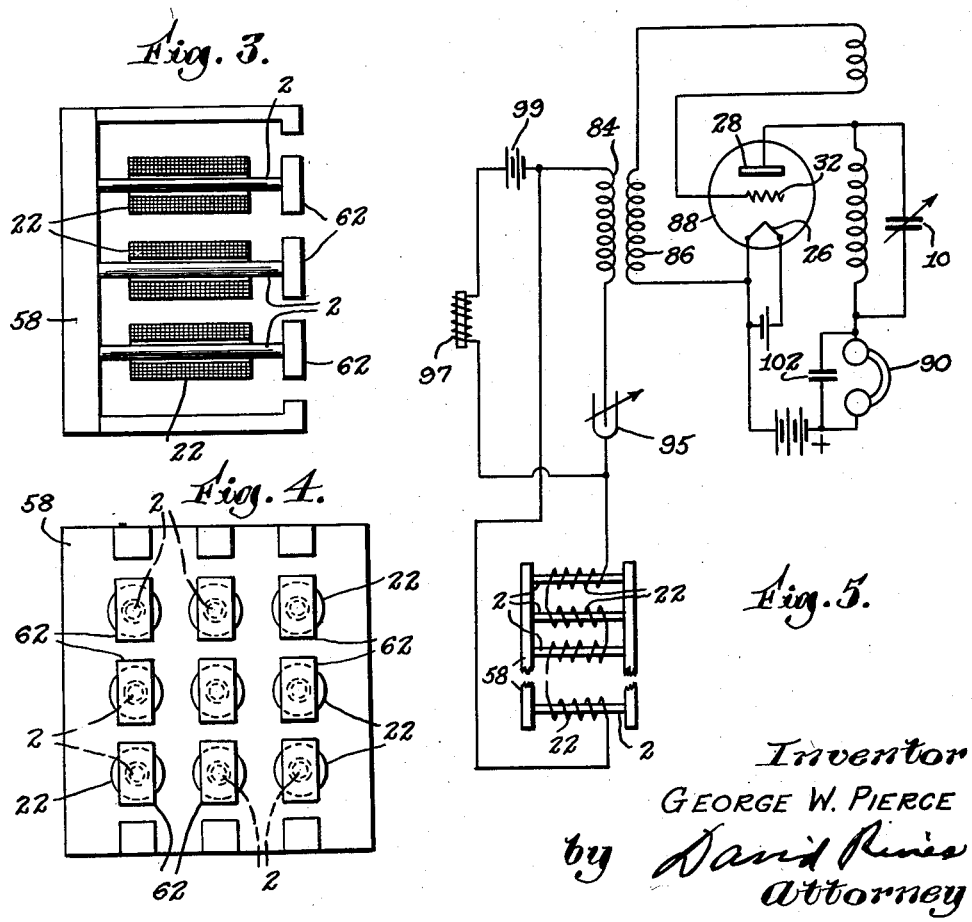
Inventor
GEORGE W. PIERCE
by David Rines
Attorney Patented Sept. 17, 1935

2,014,413

UNITED STATES PATENT OFFICE 2,014,413

MAGNETOSTRICTIVE RECEIVER

George Washington Pierce, Cambridge, Mass.

Application May 11, 1935, Serial No. 20,920

5 Claims. (Cl. 177—386)

The present invention relates to the reception of intelligence, using sound as the agency of communication, and more particularly to communication by sound through air, water or other fluid media. The present application is a continuation in part of application Serial No. 158,452, filed January 3, 1927, which matured, on March 11, 1930, into Letters Patent No. 1,750,124, reissued as Patent 19,461, on February 12, 1935.

The invention will be explained in greater detail in connection with the accompanying drawing, in which Fig. 1 is a diagrammatic view, partly in section, of apparatus and circuits constructed and arranged to illustrate a principle of the present invention, the section being taken upon the line 1—1 of Fig. 2, looking in the direction of the arrows; Fig. 2 is an elevation of the same; Figs. 3 and 4 are views similar to Figs. 1 and 2, respectively, of a modification; and Fig. 5 is a diagrammatic view of a receiving system according to the present invention.

A plurality of rigid cores 2 of highly magnetostrictive material are shown disposed side by side and spaced from each other, and each axially positioned in an inductive coil 22. The coil magnetizes the core, but it does more; it is an essential element in the magnetostrictive interchange between the coil and the core. When the core vibrates, as in the reception of intelligence, the coil receives energy from the core by the magnetostrictive change of magnetic flux in the core. This magnetostrictively varied flux through the coil induces in the coil a voltage of the frequency of flux variation. The voltage is thus developed in the coil by magnetostriction; both the coil and the core are necessary for the magnetostrictive interchange of vibrational and electromagnetic energy. Each coil, therefore, cooperates magnetostrictively with its corresponding core 2. The cores 2 may be uniformly distributed over the whole surface of the diaphragm and may be held in place so as each to vibrate freely longitudinally about a nodal point at its center. The diaphragm may be circular instead of square, as illustrated. The cores 2 may be distributed over the surface of the diaphragm 58 in an arrangement of concentric circles, one of which is illustrated in Fig. 2, or the array of cores may take some other form, as in Fig. 4. The modification of Figs. 3 and 4 may be utilized in either of two ways. That is, the separate cap plates 62 may be placed in contact with the medium and used as receiving faces, or, preferably, the single diaphragm 58 (which need not, of course, be rectangular but may have any convenient shape) may be the receiving face. In this case, the cap plates 62 act as inertia loads at the ends of the cores 2, and should be of such mass and dimensions as to aid in adapting the mechanical constants of the vibrator for maximum transfer of energy between the medium and the receiving face 58. The cores 2 preferably have all substantially the same period of mechanical vibration. When stimulated by magnetic fields created by currents in their respective coils 22, the cores 2 become slightly mechanically deformed or distorted by magnetostriction. The resulting increment of deformation may be a lengthening or a shortening, or some other distortion, depending on the material and on the polarity of the increment of the magnetic field. Conversely, when the cores 2 are mechanically deformed or distorted, they will respond magnetostrictively with an increment of magnetization depending upon the nature of the preexisting magnetic field and the mechanical deformation. Such a change in magnetic state results in inducing a corresponding voltage in the coils 22. The mechanical deformation may be produced by the incidence of sound waves on the diaphragm 58, in which case the system vibrates at the frequency of the incident sound, and voltages of the same frequency are induced in the coils 22.

The cores 2 may be in the form of tubes (not shown) or rods, as illustrated, or they may be otherwise constructed, as explained in the said Letters Patent. As is also described in the said Letters Patent, they are preferably of nickel, nickel-steel, nickel-copper, nickel-cobalt, chrome-nickel, chrome steel, or of any other metal element or alloy characterized by comparatively large magnetostrictive effects. By proper choice of length and other dimensions, the apparatus may be made applicable to systems of high or low frequency within a range that may, practically, extend from a few thousand cycles to hundreds of thousands of cycles.

Thus a novel mechanical vibratory system is provided, comprising the cores 2 and diaphragm means, for use as a sonic oscillator in the reception of sounds of any desired frequency, particularly high frequencies, for sonorously communicating through air, water, or other fluid media in which the diaphragm means is positioned. The system finds particular value at superaudible frequencies, the period of the said vibration and the consequent sound wavelength received being small enough so that the system can be directively discriminating as to the sound. The diaphragm 58 is thus a directive diaphragm.

The cores 2 are shown in Fig. 1 and Fig. 2 attached at their ends to one or more diaphragms 58 at separated, spaced positions, thereby adding to the elastic forces acting on a diaphragm 58 and contributing to its period of vibration. The cores 2 may serve also, partly or wholly, as elastic supports for a diaphragm 58, in the event that the diaphragm 58 is not otherwise supported. The distances between the said spaced positions of the cores 2 should be small relatively to the wavelength of sound in the sound-conveying medium, in order that their elastic restoring forces shall be evenly enough distributed over the diaphragm to prevent the diaphragm breaking up into harmonic modes of vibration. The diaphragm 58 constitutes a wall that actuates the cores 2, and that may be positioned in sonorous relation with a sound-conveying medium, such as air, or the water of the ocean, for receiving elastic vibrations. The cores 2 effectively cooperate with the diaphragm 58 and the coils 22 by their mechanical expansion and contraction magnetostrictively to transform the incident energy in the sound-conveying medium into electromagnetic energy. One of the faces 58 may be a rigid supporting plate, if desired, the other face 58 serving as a receiving diaphragm. The vibrator may be rotatable or orientable as a unit, so as to cause the diaphragm 58 to assume any desired direction, or it may be fixed.

The coils 22 may be connected together, either in parallel, or in series, as desired. The fields of adjacent coils 22 may be reversed, so that the lines of force may go to the right through one set of cores 2, and to the left through the alternately placed set of cores 2. When the device is used for transmission, conductors 12 and 14 connect the cores 2 in series with a source of alternating electromotive force, such as an alternating current generator 16, for passing an actuating periodic current through the coils 22. Other, more complicated, sources of alternating current are illustrated in other figures of the above-entitled Letters Patent.

When sound waves impinge normally on the receiving face 58, this face is forced to vibrate in a direction parallel to the lengths of the cores 2. Consequently, the cores are alternately compressed and stretched longitudinally at the frequency of the incoming sound waves. At certain frequencies of the incoming waves, the mechanical reactances of mass and stiffness in this vibratory system of cores 2 and diaphragm 58 cancel each other; at these frequencies the mechanical system is resonant, and the vibration amplitude for a given received sound pressure is enormously magnified. Correspondingly, of course, the voltages magnetostrictively induced in the coils 22 are very much greater at resonant frequencies of the system.

At the fundamental resonance the system has a single nodal plane for longitudinal vibration. This nodal plane is intermediate to the faces 58 and, under the usual conditions of symmetry, parallel to them. In this nodal plane the cores exhibit no longitudinal vibration, but a maximum of radial vibration. The spacing of the cores apart from one another allows this radial vibration to occur freely without detrimental effect on the desired longitudinal vibration.

Resonant vibrational modes other than the fundamental, corresponding to the occurrence of two or more nodes in each core, are, of course, also utilizable according to the present invention, or the vibrator may be made substantially non-resonant to the frequency employed.

It will be noted that if a number of sound waves of different frequencies—some corresponding to a desired signal and others to interference (such as water noise)—impinge simultaneously on the diaphragm, the voltages induced in the coils 22 by the desired signal will be much magnified in relation to the voltage created by the interfering signals. Moreover, if the wavelengths of the sounds in the medium are small compared to the linear dimensions of the diaphragm 58, the vibratory system will be discriminating in favor of sound propagated in the medium in a direction normal to the diaphragm. Consequently, the vibrational portion alone of the receiving system is able to discriminate both directionally and as to frequency, in favor of a desired signal.

By proper choice of dimensions, then, the cores may be proportioned effectively to cooperate vibrationally with the diaphragm 58 at the frequency or frequencies at which the system is designed to be sensitive.

The mechanical system is thus tuned to the desired frequency, and adjusted to the medium in which it is to be used. To get the maximum sensitivity from the previously designed vibrator, the electrical characteristics of the circuit will also be properly tuned, as illustrated in Fig. 5, so as to have a substantially zero reactance for the natural period of mechanical vibration of the vibrator. By thus tuning the mechanical and the electrical systems into resonance with each other, the current or voltage of the receiver, corresponding to the desired signal, becomes enormously increased. Under certain conditions, however, it may be desirable to eliminate resonance in the mechanical system, as by the introduction of damping, and rely for frequency selectivity largely on the tuning of the amplifier. By these means, a single vibratory unit may be used at any of a number of frequencies to which the amplifying system is tunable. With such a non-resonant vibrator, an amplifier of high gain must be employed.

As each core 2 is of relatively small, cross-sectional area, the total aggregate of cross-sectional areas of the metal of the magnetostrictive cores 2 is but a small fraction of the whole extent of the restricted area of the diaphragm means, as illustrated, owing to the spaced points at which the cores are affixed to the diaphragm means. Thus, it is relatively easy to compress and expand them, as a unit. By proper design of the cross-sectional areas and spacing of the cores over the surface of the diaphragm, it is thus possible to produce a relatively yielding vibrator well suited, in its mechanical impedance characteristics, to interchange energy with such a medium as water. It is not necessary to pack the driving cores continuously and closely together.

The novel vibrator of the present invention is thus constituted of a plurality of magnetostrictive bodies 2, dimensioned and tuned in cooperation with the faces 58 to the frequency of the received signal, for resonantly cooperating synchronously with the diaphragm means through their resonant expansion and contraction in response to incident sound waves to interchange electromagnetic and sound energy with the sound-conveying medium. A multiple unit of this character will produce far greater electrical power from a given sound signal in the medium than a single unit of corresponding area, and is freer from eddy-current and hysteresis losses. It also can be made more easily to conform elastically to the medium in which it is operating. The number of elements 75 and their distribution make possible a piston-wise cophasing of the diaphragm 58. The multiple-driven diaphragm is elastically supported at properly spaced, relatively small, distributed areas, and by proper distribution of these supports, as determined by the thickness of the diaphragm 58 and the mechanical characteristics of the medium, the diaphragm may be caused to vibrate piston-wise in response to normally incident sound, with all portions of the diaphragm 58 vibrating in substantially the same phase. The system is also characterized by great durability, constancy, and high efficiency. The magnetostrictive drive produces an elasticity determined in large part by the driving rods or tubes themselves, but the diaphragm means and the cores 2 have elastic and mass constants and dimensions of values to cause the diaphragm means and the cores both to contribute substantially to the vibration of the mechanical system constituted of the diaphragm means and the cores 2. A distribution of these members over the face of the diaphragm supplies rigidity to it at a multitude of points and insures a more uniform elasticity for the whole receiving diaphragm.

Supersonic sound waves in a medium thus may be received and their direction of propagation ascertained by a suitably orientable sound-receiving vibrator of a receiving system, as illustrated in Fig. 5. The vibrator may be like those illustrated in Figs. 1 to 4. The coils 22 of the receiving vibrator are connected in circuit with a tuning condenser 95 and a coil 84. The cores may be magnetically polarized by a parallel feed consisting of a source 99 of direct or alternating potential, and containing a choke coil 97 for confining the signal-frequency current to the circuit containing the energizing coils 22. If the source 99 is a source of alternating current, received signals of supersonic frequency will then be modulated at twice the frequency of the source 99. The diaphragm 58 of the receiving system is thus magnetostrictively associated with the coil 84, which is coupled to a coil 86 in the input circuit of a receiving vacuum tube 88, comprising a filament 26, a plate 28 and a grid 32. The coils 84 and 86 thus constitute a transformer for applying the received signal to the grid of the tube 88. The tube 88 represents diagrammatically an amplifier for amplifying the energy of the unitary vibrator, so as to enhance the received signals and reduce the electrical decrement of the circuits, and that is connected with a telephone 90 or other device for detecting oscillatory electric currents in the system. An additional tuning condenser 100 may be employed for tuning the output circuit of the tube 88, between the filament or cathode 26 and the plate or anode 28. It is possible to make the tube 88 oscillate at a frequency slightly different from that of the signal, so that a difference frequency may be heard in the telephone 90. This is of use when the received signal is of a super-audible frequency. In this case, the telephones should be by-passed, for the superaudible frequencies, by the condenser 102.

The term "sound", as used herein, includes not merely audible sound, but all vibrations of a similar nature, including superaudible vibrations. If the sound frequency employed is above the audible range, the heterodyne principle as described above may be used to render the signal audible.

Instead of the inductive coupling between the vibrator and the amplifier shown in Fig. 5, other methods of coupling used in related arts may be employed.

The amplifier shown in Fig. 5 is not intended to be limited to a single tube. The telephones 90 may be replaced by an audio-frequency amplifier for intensifying the received signal, or a multi-stage amplifier for the signal frequency may replace the tube 88. Such an amplifier should, preferably, be tuned to the signal frequency to further reduce the interfering effect of signals of frequency different from those to which the vibrator is mechanically tuned.

Other modifications, too, will be obvious to persons skilled in the art, and all such are considered to fall within the spirit and scope of the present invention, as defined in the appended claims.

What is claimed is:

1. A frequency-discriminating sound receiver for the reception of sound signals of a predetermined frequency higher than speech frequencies having, in combination, a mechanical vibratory system comprising diaphragm means adapted to be positioned in relation to a sound-conveying medium for the directional reception of sound of the said predetermined frequency from the medium, and core means of highly magnetostrictive material affixed to the diaphragm means, coil means magnetostrictively cooperative with the core means, the cross-sectional area of the metal of the core means being small relative to the area of the diaphragm means, but the core means being magnetically polarized and the vibratory system being proportioned effectively to transmit vibrational stresses of the said predetermined frequency lengthwise of the core means to and from the diaphragm means in order to enable the core means to cooperate with the coil means, by its expansion and contraction in response to the incidence of sound of the said predetermined frequency in the medium upon the diaphragm means, to generate electric voltages magnetostrictively in the said coil means, and an electric network coupled to said coil means and adapted to cooperate with said vibratory system, by selective enhancement of said electric voltages of said predetermined frequency, to render the receiver sensitive to sounds of said predetermined frequency, and insensitive to sounds of other frequencies, said electric network comprising an amplifier having an input circuit coupled to the coil means and an output circuit, and signal-indicating means connected in the output circuit.

2. A system for the reception of sound of predetermined frequency higher than speech frequencies in a sound-conveying medium comprising a mechanical vibrator disposable in the medium for the reception of sound of the said predetermined frequency and having a diaphragm and core means of highly magnetostrictive material magnetically polarized and affixed to the diaphragm, coil means cooperatively associated with the core means, the mechanical vibrator being proportioned effectively to transmit vibrational stresses of the said predetermined frequency lengthwise of the core means to and from the diaphragm means by the expansion and contraction of the core means in response to the incidence of sound of the said predetermined frequency in the medium upon the diaphragm in order to enable the core means to cooperate with the coil means to transform vibrational energy in the core means, by magnetostrictive change in magnetic flux in the core means, into electrical energy, and an amplifier for enhancing said electrical energy, said amplifier having an input circuit coupled to said coil means and an output circuit containing an indicator, the diaphragm having dimensions large in comparison with the wavelength of said high-frequency sound in the medium, whereby the system is rendered directionally discriminatory.

3. A system for the reception of sound of predetermined frequency higher than speech frequencies in a sound-conveying medium comprising a mechanical vibrator disposable in the medium for the reception of sound of the said predetermined frequency and having a diaphragm and core means of highly magnetostrictive material magnetically polarized and affixed to the diaphragm, coil means, cooperatively associated with the core means, the mechanical vibrator being proportioned effectively to transmit vibrational stresses of the said predetermined frequency lengthwise of the core means to and from the diaphragm means by the expansion and contraction of the core means in response to the incidence of sound of the said predetermined frequency in the medium upon the diaphragm in order to enable the core means to cooperate with the coil means to transform vibrational energy in the core means, by magnetostrictive change in magnetic flux in the core means, into electrical energy, and an amplifier for enhancing said electrical energy, said amplifier having an input circuit coupled to said coil means and an output circuit containing an indicator, said amplifier being adjustably discriminatory as to frequency and tuned to said predetermined frequency, whereby the system is rendered selectively discriminatory in favor of said predetermined frequency and against interfering sound of different frequency.

4. A system for the reception of sound of predetermined frequency higher than speech frequencies in a sound-conveying medium comprising a mechanical vibrator disposable in the medium for the reception of sound of the said predetermined frequency and having a diaphragm and core means of highly magnetostrictive material magnetically polarized and affixed to the diaphragm, coil means cooperatively associated with the core means, the mechanical vibrator being proportioned effectively to transmit vibrational stresses of the said predetermined frequency lengthwise of the core means to and from the diaphragm means by the expansion and contraction of the core means in response to the incidence of sound of the said predetermined frequency in the medium upon the diaphragm in order to enable the core means to cooperate with the coil means to transform vibrational energy in the core means, by magnetostrictive change in magnetic flux in the core means, into electrical energy, and an amplifier for enhancing said electrical energy, said amplifier having an input circuit coupled to said coil means and an output circuit containing an indicator, said mechanical vibrator being resonantly discriminatory as to frequency, the vibrations of the vibrator being substantially a maximum at said predetermined frequency, and said amplifier being discriminatory as to frequency and yielding a maximum of amplification for the said frequency, whereby the system is rendered selectively discriminatory in favor of said predetermined frequency and against interfering sound of different frequency.

5. A system for the reception of sound of predetermined frequency higher than speech frequencies in a sound-conveying medium comprising a mechanical vibrator disposable in the medium for the reception of sound of the said predetermined frequency and having a diaphragm and core means of highly magnetostrictive material magnetically polarized and affixed to the diaphragm, coil means cooperatively associated with the core means, the mechanical vibrator being proportioned effectively to transmit vibrational stresses of the said predetermined frequency lengthwise of the core means to and from the diaphragm means by the expansion and contraction of the core means in response to the incidence of sound of the said predetermined frequency in the medium upon the diaphragm in order to enable the core means to cooperate with the coil means to transform vibrational energy in the core means, by magnetostrictive change in magnetic flux in the core means, into electrical energy, and an amplifier for enhancing said electrical energy, said amplifier having an input circuit coupled to said coil means and an output circuit containing an indicator, said magnetostrictive core means being distributed substantially uniformly over the whole surface of the diaphragm at spaced positions for maintaining substantial uniformity of vibrational phase over the surface of the diaphragm, and the aggregate cross-sectional area of the metal of the core means being small relative to the area of the diaphragm, whereby the elastic characteristics of the vibrator are adapted to the constants of the medium.

GEORGE W. PIERCE.